United States Patent [19]

Pinede et al.

[11] Patent Number: 4,515,998
[45] Date of Patent: May 7, 1985

[54] CONVERTIBLE DESK TO WALL MOUNTED TELEPHONE SET

[75] Inventors: Edourd Pinede, Norwalk; William J. Seidel, Stratford, both of Conn.

[73] Assignee: PKS/Communications, Inc., Milford, Conn.

[21] Appl. No.: 593,581

[22] Filed: Mar. 26, 1984

[51] Int. Cl.³ .............................................. H04M 1/04
[52] U.S. Cl. ............................ 179/146 R; 179/100 C; 179/178; 179/179
[58] Field of Search .............. 179/146 R, 100 C, 178, 179/179, 102; 248/205.1, 220.2

[56] References Cited

U.S. PATENT DOCUMENTS

| | | | |
|---|---|---|---|
| 3,073,911 | 1/1963 | Mattke et al. | 179/100 C |
| 3,715,519 | 2/1973 | O'Leary | 179/178 |
| 3,859,476 | 1/1975 | Morrell et al. | 179/100 C |
| 4,292,477 | 9/1981 | Adams et al. | 179/100 C |
| 4,395,591 | 7/1983 | Kaczkos | 179/100 C |

FOREIGN PATENT DOCUMENTS 2636848 8/1976 Fed. Rep. of Germany ... 179/100 C

Primary Examiner—Gene Z. Rubinson
Assistant Examiner—Danita R. Byrd
Attorney, Agent, or Firm—Kramer and Brufsky

[57] ABSTRACT

A desk supported telephone set is provided with a case attached to an inclined base adapted to be seated on a horizontal surface to tilt the case and a telephone receiver mounted thereon towards the user. The same case may be mounted on a substantially vertical wall surface by removing the base from the case, rotating it 180° and reattaching it to the case. When the base is mounted on a vertical surface, the case will extend away from the vertical wall surface at an acute angle with the case inclined towards the user for easy access to the receiver seated on the case. To assure that the receiver is held firmly to the case when the set is mounted in an inclined manner on the vertical wall surface, the case is provided with removable, integrally molded fasteners which upon severance from the case can be used to secure the receiver to the case. The fastener consists of an inverted U-shaped staple whose bight portion is inserted within the receiver while the legs of the inverted U-shaped staple are inserted within a pair of spaced openings in the case.

9 Claims, 8 Drawing Figures

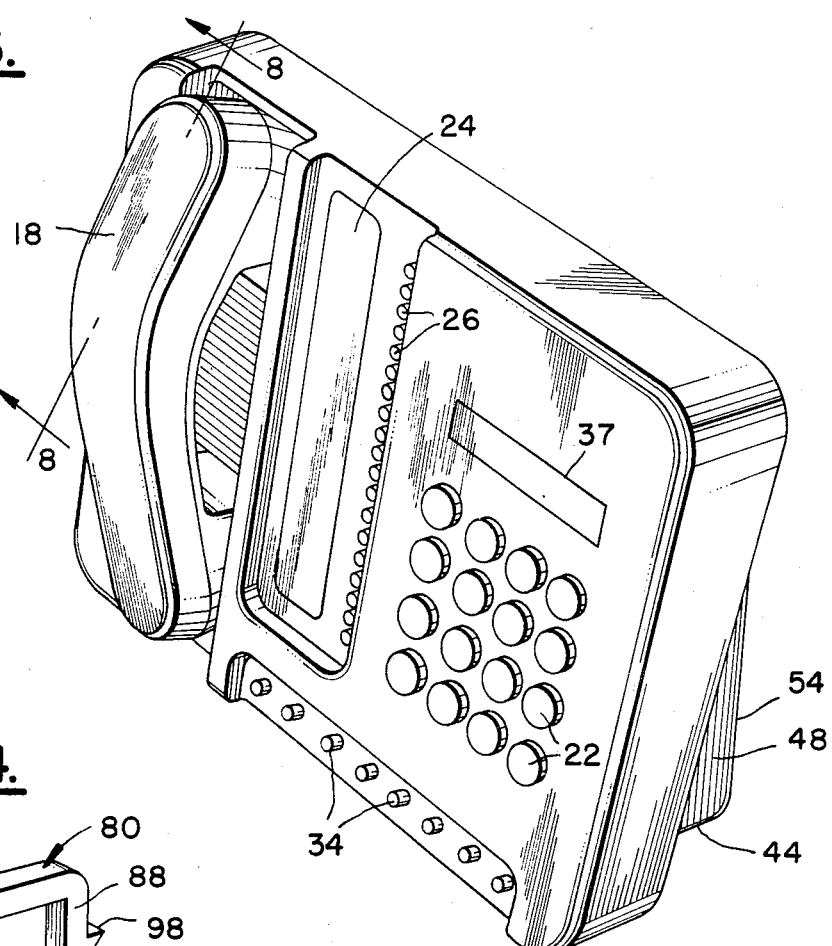
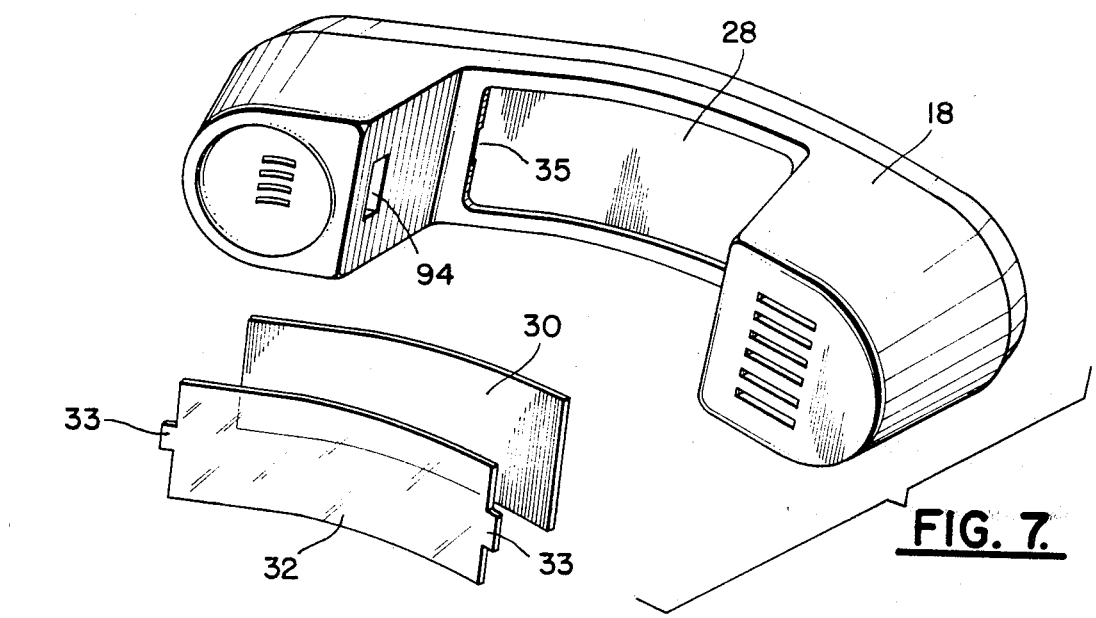

CONVERTIBLE DESK TO WALL MOUNTED TELEPHONE SET

BACKGROUND OF THE INVENTION

1. Field of the Invention

This invention relates to a support for a telephone set, and more particularly, a support for normally seating a telephone set on a substantially horizontal, planar desk surface which can also be used to hang the telephone set on a vertical plane surface, such as a wall.

1. Description of the Prior Art

Telephone sets are provided with cases which serve as a console for housing the electronic components of the telephone and are provided with a slot or a cradle for supporting the telephone receiver. When supported on a horizontal planar surface, such as a desk, the console is supported at an acute angle above the surface so that the receiver can be readily grasped and removed from the console and the push buttons or rotary dial mechanism for dialing a number are readily veiwable by the user. However, if such a console was mounted upon a vertical planar surface such as a wall, the upper surface of the console would be inclined towards, rather than away from the vertical surface with its upper end at a greater distance from the surface than its lower end, rendering the console virtually unusable, as the operator of the telephone would not have a good view of the dial buttons or rotary dial and the receiver would readily become disattached and fall from the slot or cradle mounting on the console. In order to remedy this situation, it has been common in the art to hang the telephone receiver from a specially shaped wall console designed to be mounted on the wall wherein the the receiver would be received without falling from the console or a separate adaptor was provided to mount the entire console so that the console would hang in a substantially vertical condition when mounted on the adaptor. However, in the latter instance additional expensive parts are required to be molded and utilized making such telephone sets expensive, wherein in the former instance specially designed wall units could not be seated on a horizontal desk surface.

SUMMARY OF THE INVENTION

In accordance with this invention, a desk supported telephone set is provided with a case attached to an inclined base adapted to be seated on a horizontal surface to tilt the case and a telephone receiver mounted thereon towards the user. The same case may be mounted on a substantially vertical wall surface by removing the base from the case, rotating it 180° and reattaching it to the case. When the base is mounted on a vertical surface, the case will extend away from the vertical wall surface at an acute angle with the case inclined towards the user for easy access to the receiver seated on the case. To assure that the receiver is held firmly to the case when the set is mounted in an inclined manner on the vertical wall surface, the case is provided with removable, integrally molded fasteners which upon severance from the case can be used to secure the receiver to the case. The fastener consists of an inverted U-shaped staple whose bight portion is inserted within a pair of spaced openings in the case.

BRIEF DESCRIPTION OF THE DRAWINGS

Further objects and advantages of the present invention will become apparent from the following description and claims and from the accompanying drawings, wherein:

FIG. 4 is a perspective view of a staple used to mount the telephone receiver of the telephone set of the present invention on the console when the telephone set is mounted on a vertical wall surface;

FIG. 6 is a perspective view of the telephone set of FIG. 1 mounted on a vertical wall surface;

FIG. 7 is an exploded perspective view of the telephone receiver of the telephone set of the present invention.

DETAILED DESCRIPTION OF THE PREFERRED EMBODIDMENT

Figure 1:
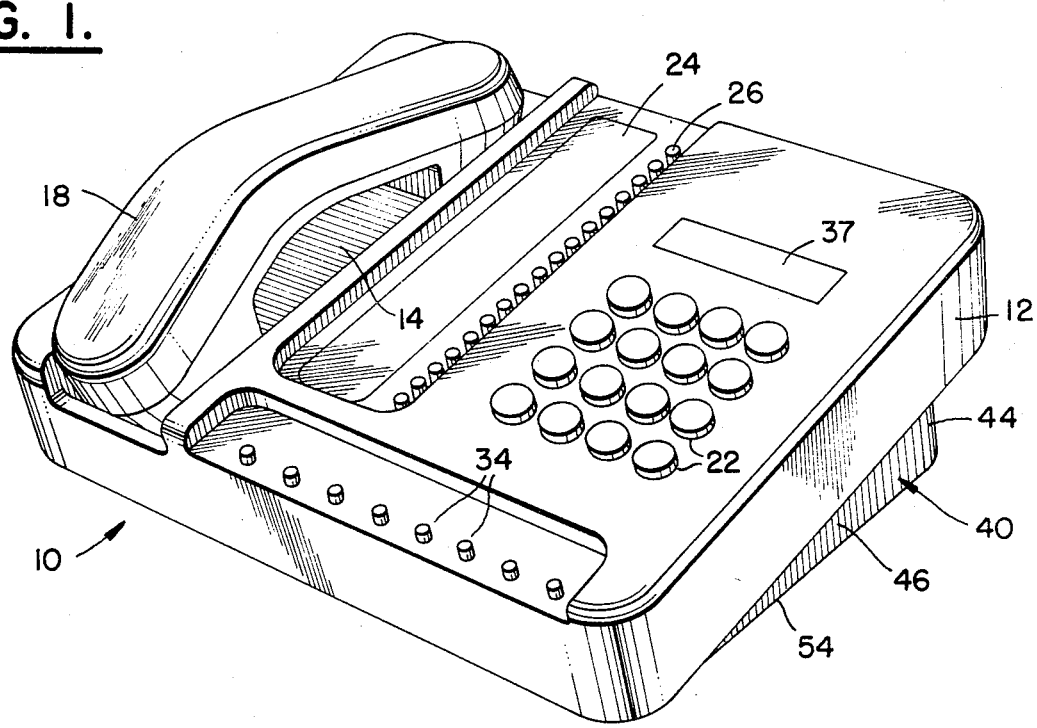
FIG. 1 is a perspective view of the telephone set of the present invention seated on a horizontal support surface.

Referring now to the drawings in detail, wherein like numerals indicate like elements throughout the several views, the telephone set 10 of the present invention includes a case or console 12 housing the electronic components of the telephone set. The console 12 is provided with an elongated slot 14 having a substantially rectangular block 16 cast integrally therewith to serve as a support for a telephone receiver 18. As is well known in the art, upon seating of the receiver within the elongated slot 14 on block 16, a button 20 will be depressed to break the connection with an external telephone line. Upon lifting of the receiver 18 from the slot 14, the button 20 can be extended and a switch closed to activate the telephone equipment and connect it to an outside line, so as to enable the user of the equipment to obtain a dial tone.

Although not forming a part of the invention, it will be understood that the console or case 12 is provided with push buttons 22 for performing various functions utilizing the console, as for example communication with another person at a remote location through a telephone line. The console 12 also includes a slot 24 for receipt of printed indicia on a card (not shown) which can be secured in the slot. The indicia can identify, for example, various persons who can be communicated with through the use of the console 12 by merely depressing a button 26 adjacent the indicia on the card. Similarly, the receiver can be provided with a slot 28 for receipt of a complementally shaped card 30 which can be used to record frequently dialed outside telephone numbers or the like. The card 30 can be secured in slot 28 by a transparent plastic overlay 32 having tabs 33 at opposite ends received within slots 35 in the receiver 18. A horizontal slot 37 can be provided on the console 12 to receive printed indicia identifying the user's telephone number whereas a bank of horizontal buttons 34 can also be provided for performing various telephone functions such as conference calls, paging, holding while taking another message, and the like.

The console 12 and receiver 18 are normally mounted on an inclined base generally designated by the numeral 40. The base 40 includes a front surface 42 and a larger rear surface 44, which are connected by wedge-shaped side surfaces 46 and 48. The front surface 42 is smaller in vertical extent than the rear surface 44 so that when the base is seated on a substantially horizontal planar surface, such as a desk top, the higher or upper surface 50 thereof which is defined by a rectangular contiguous peripheral rim 69, will be inclined or form an acute angle with the horizontal planar surface so that the console 12 mounted on the upper surface 50 of base 40 will be tilted towards the user of the telephone set, as shown in FIG. 1.

The base 40 comprises a mounting stand for the console 12 and receiver 18. The interior of the base 40 is hollow except for a molded rectangular section 52 which extends substantially parallel to the horizontal plane or desk top surface. The rectangular surface 52 extends inwardly from the plane of the lower surface 54 of the base 40 and which can be provided with a plurality of slots (not shown) formed therein which will enable the dissipation of heat which may be generated by certain ones of the interior electronic components within the console 12, which can also be provided with openings beneath such slots. A rubber or foam rectangular pad 56 and 58 are secured by glue or adhesive to opposed lateral edges of the base 40 to serve as a foot for base 40 which will not scratch or mark the support surface. A pair of threaded bores 59, 60, and 62, 64 are provided adjacent the top and bottom edges, respectively of base 40 so that a threaded fastener 65 may be inserted therethrough into complementary bores 66 in the rear surface of the console 12 to fix the base 40 to the console. The distance between the pairs of bores 62, 64 and 59, 60 in the vertical direction is equal to the vertical distance between pairs of bores 66 on the rear surface of console 12, whereas the horizontal distance between the bores 62, 64 and 59, 60 of each pair is also equivalent to the horizontal distance between the bores 66 in each pair thereof. The bottom surface of the console 12 is provided with a rectangular groove 68 for receiving and locating the complementally shaped peripheral edge or rim 69 of base 40 so as to align bores 66 with each pair of bores 59, 60 and 62, 64.

Figure 2:
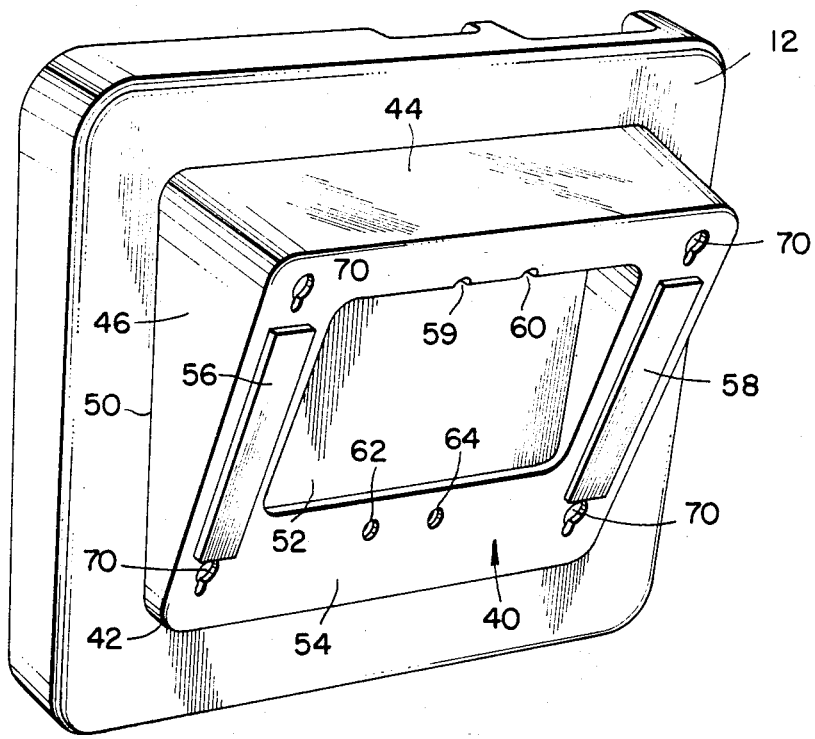
FIG. 2 is a perspective view of the bottom of the console and the base of telephone set of FIG. 1.
Figure 3:
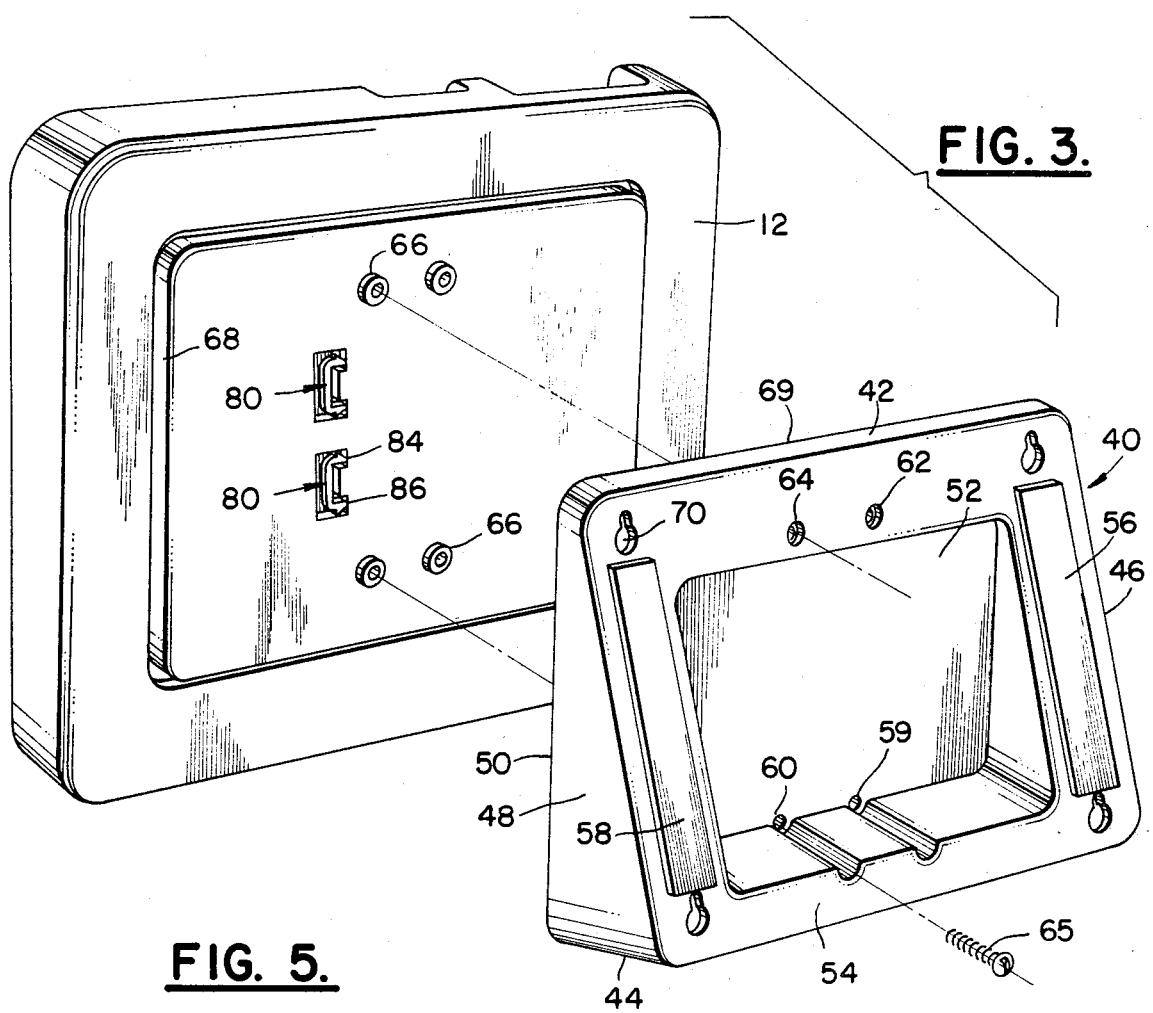
FIG. 3 is an exploded view of the bottom of the console and the base of the telephone set of the present invention with the base rotated 180° from that shown in FIG. 2 to convert the telephone set from being adapted to be supported on a horizontal support surface to being adapted to be supported on a vertical wall.
Figure 5:
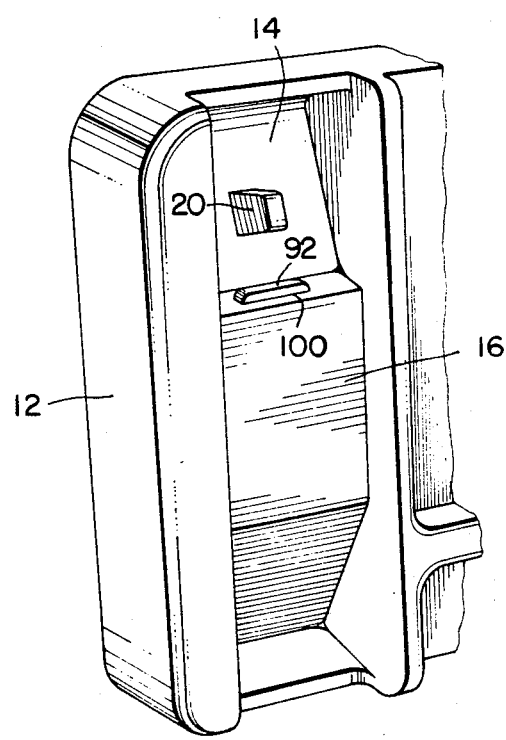
FIG. 5 is a partial view of the left hand side of the telephone set console of the present invention illustrating the slot on the console for receiving the telephone receiver of the telephone set of the present invention.
Figure 8:
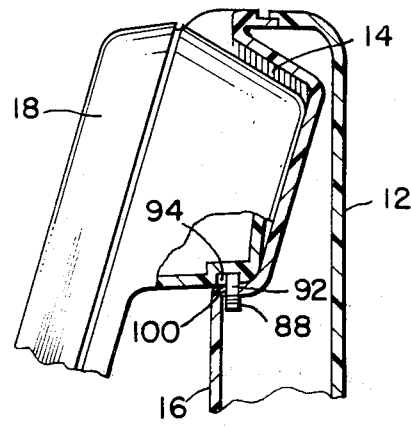
FIG. 8 is a cross-sectional view taken substantially along the plane indicated by line 8—8 of FIG. 6 and illustrating the manner in which the receiver can be secured to the console when the telephone set is mounted on a vertical wall.

In order to mount the console 12 and receiver 18 on a vertical planar surface, such as a wall, it is only necessary to remove the fasteners 65 from the bore 59, 60, and 62, 64, and rotate the base 40 180° from the position shown in FIG. 2 to the position shown in FIGS. 3 and 6, and reattach the console 12 to the base 40 by replacing the rim 69 in groove 68 and by placing the fasteners 65 through the realigned bores in the base and those in the console.

Provided above and below each of the pads 56, 58 is a key hole slot 70. In the position of FIG. 3 and 6 each key hole slot 76 is spaced from the rear surface of console 12 and may be entered by a hook or nail or the like. Upon positioning of the base on a suitable hook or other implement, the console 12 and receiver 18 can be hung from a vertical wall surface at an acute angle to the vertical planar surface of the wall tilted towards the user as the larger rear surface 44 of the base is now reversed and positioned adjacent the bottom edge rather than the top edge of the console 12, thus enabling the console 12 to be tilted towards the user in such a manner that the push buttons 22 are viewable and the receiver 18 will be seated on the block 16. If the base 40 was hung on the vertical wall surface in its original connected position (as appears in FIGS. 1 and 2) to the rear surface of the console 12, the console will normally tilt in the opposite direction wherein the receiver 18 would slide off and fall from the slot 14 and mounting block 16 and the push buttons 22 would normally be tilted at an angle where they would not be readily ascertainable or viewable by the user of the console.

To assure that the receiver 18 is held firmly to the console 12 when the set 10 is mounted in an inclined manner on a vertical wall surface, the console is provided with removable, integrally molded fasteners 80 which upon severance from the console can be used to secure the receiver 18 to the console 12. The rear surface of the console 12 could be provided with integrally molded plastic staples 80 which may be pivoted and severed along points of weakness 84, 86 attaching each of the legs 88, 90 of each staple to the rear surface of the console. The bight portion 92 of one of the staples 80 may be inserted within an opening 94 in the receiver 18 so as to assure that the receiver is held on the front of the console 12 when it is mounted on a vertical wall surface. The legs 88, 90 of each staple 80 terminate in points 96 having shoulders 98. The points 96 (and legs 88, 90) may be inserted in a slot 100 (or alternatively, a pair of spaced openings) on the top of block 16 by squeezing the points 96 towards each other, and upon reexpansion of the legs the shoulders 98 associated with each leg will preclude upward removal of the staple from the slot 100, thereby permanently mounting the staple 80 on block 16 in slot 100, but permitting easy removal and remounting of receiver 18 and slot 94 on the extended bight portion 92 of staple 80.

Thus, it will be apparent that the mounting base 40 utilized with the console 12 and telephone set 10 can be used to convert the console of the telephone set from being supported on a horizontal planar surface, such as a desk top, to being hung and mounted on a vertical planar surface, such as a wall, by merely relocating the upper surface 44 of the base 40 relative to the rear surface of the console 12, by rotating the base 40 180° and reattaching it to the rear surface of the console.

We claim:

1. A convertible support for a telephone console comprising:
 a base member including an upper edge, a lower edge and a pair of wedge-shaped side edges connecting said upper edge to said lower edge,
 said upper edge being of greater width than said lower edge,
 said base being hollow but including a top surface provided with:
 means for securing said base to the rear surface of said console in a first position whereby said base can support said console on a substantially horizontal surface and an alternative second position defined by rotation of said base 180° relative to said console whereby said base can support said console on a substantially vertical surface, and
 means on said base for hanging said base and console upon a vertical surface.

2. The support of claim 1 in combination with said console including
  means for locating said base relative to the rear surface of said console in said first and second positions including a peripheral rim on said base, and said console includes
  a complementally shaped groove receiving the peripheral rim of said base.

3. The combination of claim 2 wherein said rim and groove are substantially rectangular in shape.

4. The support of claim 1 in combination with said console wherein said securing means includes
  a pair of vertically spaced openings formed in said base,
  a pair of vertically spaced openings formed on the rear surface of said console,
  the vertical distance between said pairs of openings on said base and on said console being equal,
  the horizontal distance between each of said openings in each pair on said base and said console being equal,
  whereby each of said pair of openings on said base and on said console will be aligned upon 180° relative rotation of said base and console, and
  fastener means adapted to be inserted between the openings in said base and said console.

5. The support of claim 1 wherein said hanging means includes at least one keyhole slot on said base.

6. The support of claim 1 including a pair of spaced pads mounted on a bottom surface of said base.

7. The support of claim 1 in combination with said console and a telephone receiver adapted to be mounted on said console,
  said console including an elongated slot adapted to receive said receiver therein, and
  means provided on said console for securing said receiver on said console within said slot.

8. The combination of claim 7 wherein said means for securing said receiver on said console includes
  an inverted, substantially U-shaped staple having a bight portion and a leg connected to each end of said bight portion,
  at least one opening in said console receiving a leg of said staple, and
  an elongated slot in said receiver for receiving the bight portion of said staple.

9. The combination of claim 8 wherein said staple prior to use is molded integral with and is removably attached to the rear surface of said console.

* * * * *